United States Patent
Yu et al.

(10) Patent No.: US 11,304,285 B2
(45) Date of Patent: Apr. 12, 2022

(54) SYSTEM AND METHOD FOR AUTOMATICALLY RECOMMISSIONING A LIGHTING NODE USING WIRELESS SIGNAL CHARACTERISTICS

(71) Applicant: SIGNIFY HOLDING B.V., Eindhoven (NL)

(72) Inventors: Jin Yu, Lexington, MA (US); Jia Hu, Brookline, MA (US); Xiangyu Wang, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 44 days.

(21) Appl. No.: 16/975,387

(22) PCT Filed: Feb. 28, 2019

(86) PCT No.: PCT/EP2019/054948
§ 371 (c)(1),
(2) Date: Aug. 24, 2020

(87) PCT Pub. No.: WO2019/170506
PCT Pub. Date: Sep. 12, 2019

(65) Prior Publication Data
US 2020/0413522 A1 Dec. 31, 2020

Related U.S. Application Data

(60) Provisional application No. 62/639,373, filed on Mar. 6, 2018.

(30) Foreign Application Priority Data

Mar. 29, 2018 (EP) ..................................... 18164890

(51) Int. Cl.
*H05B 47/19* (2020.01)
*H04B 17/318* (2015.01)
(Continued)

(52) U.S. Cl.
CPC ............ *H05B 47/19* (2020.01); *G01S 5/0252* (2013.01); *H04B 17/318* (2015.01); *H04L 67/12* (2013.01)

(58) Field of Classification Search
CPC ............... G06F 16/1805; G06F 16/182; G06F 16/2365; G06F 16/27; G06F 21/60;
(Continued)

(56) References Cited

U.S. PATENT DOCUMENTS

| 6,016,038 A | 1/2000 | Mueller et al. |
| 6,211,626 B1 | 4/2001 | Lys et al. |

(Continued)

FOREIGN PATENT DOCUMENTS

| WO | 2015103482 A1 | 7/2015 |
| WO | 2017036771 A1 | 3/2017 |
| WO | 2017045885 A1 | 3/2017 |

*Primary Examiner* — Monica C King
(74) *Attorney, Agent, or Firm* — Daniel J. Piotrowski

(57) ABSTRACT

Methods and apparatus for assigning a role to a new lighting node in a lighting system based on a received signal strength indicator ("RSSI") fingerprint of the new lighting node. For example, methods and apparatus described herein are directed to determining RSSI fingerprints for each lighting node in a lighting system, matching one of the RSSI fingerprints to the RSSI fingerprint of a new lighting node, and assigning a role to the new 5 lighting node. The assigned role is the same role as previously assigned to the matching lighting node.

15 Claims, 5 Drawing Sheets

(51) Int. Cl.
  *G01S 5/02* (2010.01)
  *H04L 29/08* (2006.01)
  *H04L 67/12* (2022.01)

(58) Field of Classification Search
  CPC ...... G06F 21/62; G06F 21/6245; G06F 7/588;
  G06F 9/45558; G06F 2009/45595; G06F
  7/58; G06F 9/4881; G06F 16/955; G06F
  2009/45591; G06F 8/71; G06F 9/45545;
  G06F 9/4555; H04W 4/80; H04W 12/02;
  H04W 76/14; H04W 84/047; H04W
  88/10; H04W 48/18; H04W 84/10; H04W
  84/18; H04L 67/12; H04L 2209/38; H04L
  5/14; H04L 63/0407; H04L 63/104; H04L
  67/42; H04L 9/0861; H04L 9/3213; H04L
  12/4633; H04L 61/2007; H04L 61/609;
  H04L 67/02; H04L 12/2801; H04L
  12/2803; H04L 12/2854; H04L 27/0002;
  H04L 49/40; H04L 61/1511; H04L
  61/2514; H04L 61/2553; H04L 61/256;
  H04L 61/2575; H04L 61/2585; H04L
  61/2589; H04L 61/2592; H04L 63/0272;
  H04L 63/0281; H04L 63/029; H04L
  63/164; H04L 67/025; H04L 67/1008;
  H04L 67/1021; H04L 67/141; H04L
  67/142; H04L 67/28; H04L 67/2814;
  H04L 67/2838; H04L 67/2847; H04L
  67/288; H04L 67/2885; H04L 67/327;
  H04L 67/40; H04L 69/16; H04L 69/162;
  H04L 69/325; H04L 69/326; H04L
  69/329; H04L 12/2856; H04L 47/283;
  H04L 69/167; H04L 69/168; H04B 3/52;
  H04B 3/54; H04B 7/04; H04B 3/56;
  H04B 7/15507; H04B 5/0012; H04B
  5/0018; H04B 5/005; H04B 10/29; H04B
  14/02; H04B 2203/5479; H04B 3/58
  See application file for complete search history.

(56) References Cited

U.S. PATENT DOCUMENTS

| | | | |
|---|---|---|---|
| 9,866,309 B2 * | 1/2018 | Bennett | H04B 7/15507 |
| 9,912,382 B2 * | 3/2018 | Bennett | H04L 27/0002 |
| 10,452,863 B2 * | 10/2019 | Miller | G06F 21/62 |
| 10,797,781 B2 * | 10/2020 | Bennett | H04B 3/54 |
| 2006/0250980 A1 | 11/2006 | Pereira et al. | |
| 2017/0013543 A1 | 1/2017 | McCormack et al. | |
| 2017/0086279 A1 | 3/2017 | Chemel et al. | |
| 2017/0164320 A1 | 6/2017 | Holleis et al. | |
| 2017/0181254 A1 | 6/2017 | Meitl et al. | |
| 2017/0318647 A1 | 11/2017 | Vangeel et al. | |
| 2018/0041985 A1 | 2/2018 | Davaadorj | |

* cited by examiner

SYSTEM AND METHOD FOR AUTOMATICALLY RECOMMISSIONING A LIGHTING NODE USING WIRELESS SIGNAL CHARACTERISTICS

CROSS-REFERENCE TO PRIOR APPLICATIONS

This application is the U.S. National Phase application under 35 U.S.C. § 371 of International Application No. PCT/EP2019/054948, filed on Feb. 28, 2019, which claims the benefit of U.S. Patent Application No. 62/639,373, filed on Mar. 6, 2018 and European Patent Application No. 18164890.9, filed on Mar. 29, 2018. These applications are hereby incorporated by reference herein.

TECHNICAL FIELD

The present disclosure is directed generally to illumination technology with wireless network capabilities. More particularly, various methods and apparatus disclosed herein relate to replacing a wireless network enabled illumination device based on wireless signal fingerprints of neighboring devices.

BACKGROUND

Digital lighting technologies, i.e., illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g., red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

In lighting systems that include lighting devices that are wirelessly enabled, each device may be configured to perform a particular role, such as remote control operations (e.g., dimming, color changing). Device configuration often requires the expertise of an experienced technician with access to both the lighting devices and to one or more software systems to allow the technician to properly commission the device. When one or more of the devices is out-of-service (e.g., the lighting element and/or wireless component stops operating properly), a device may need to be replaced with a new device. This often requires the expertise of a similar technician to place the new device in service, again requiring a technician with the proper training, expertise, and access. However, this may be a costly and time-consuming task.

Some lighting devices include multiple sensors, such as a radio frequency ("RF") transceiver, a passive infrared ("PIR") sensor, a light level sensor, and/or an infrared ("IR") sensor. Light level information at a device may be recorded and when a device is replaced, the light level measured at the new device may be matched to the previously recorded light levels to automatically assign the role of the old device to the new device. However, in lighting devices where that do not include light detection elements, this is not possible.

Thus, there is a need in the art to detect an out-of-service lighting device without light detection capabilities in a lighting system and automatically assign the role of the out-of-service lighting device to a replacement lighting.

SUMMARY

The present disclosure is directed to techniques for assigning a role to a new lighting node in a lighting system based on characteristics of wireless signals received by the new lighting node. For example, some embodiments described herein are directed to determining received signal strength indicator ("RSSI") fingerprints for each lighting node in a lighting system, matching one of the RSSI fingerprints to the RSSI fingerprint of a new lighting node, and assigning a role to the new lighting node. The assigned role is the same role as previously assigned to the matching lighting node.

Generally, in one aspect, a method may include: receiving, at each lighting node of a plurality of lighting nodes, a plurality of respective wireless signals from the other lighting nodes of the plurality of lighting nodes; determining, for each lighting node of the plurality of lighting nodes, received signal strength indicators (RSSI) for each of the plurality of respective wireless signals received from the other lighting nodes; generating, for each lighting node of the plurality of lighting nodes, an RSSI fingerprint based on the RSSIs of the respective wireless signals received from the other lighting nodes; determining a respective lighting node role for each lighting node of the plurality of lighting nodes; storing associations between the RSSI fingerprints and the lighting node roles; identifying a new lighting node that has been used to replace an out-of-service lighting node of the plurality of lighting nodes; receiving, at the new lighting node, a plurality of respective wireless signals from the remaining lighting nodes of the plurality of lighting nodes; generating a new RSSI fingerprint for the new lighting node based on the plurality of respective wireless signals from the remaining lighting nodes; determining, based on the stored RSSI fingerprints and the new RSSI fingerprint, that the new lighting node is a replacement for the out-of-service lighting node; and assigning the role previously assigned to the out-of-service lighting node to the new lighting node.

In various embodiments, one or more of the lighting nodes may be a lamp and/or luminaire. In various embodiments, the method may further include generating training data based on the stored RSSI fingerprints; and training a machine learning model based on the training data. In various embodiments, determining that the new lighting node is a replacement for the out-of-service node may include providing the new RSSI fingerprints as input to the trained machine learning model. In various embodiments, assigning the out-of-service node role may be based on output from the machine learning model.

In various embodiments, an RSSI fingerprint for a given lighting node may be indicative of respective signal strengths of the plurality of respective wireless signals from the other lighting nodes of the plurality of lighting nodes. In some embodiments, a role for a given lighting node may include includes an alias for the given lighting node.

In some embodiments, generating the RSSI fingerprint for a given lighting node of the plurality of lighting nodes may include: determining a mean RSSI value of the RSSIs of the respective wireless signals received at the given lighting node from the other lighting nodes of the plurality of lighting nodes; converting the mean RSSI value into a linear value; normalizing the linear value with linear values determined for the other lighting nodes; polarizing the normalized linear value with normalized linear values for the other lighting nodes; and generating the RSSI fingerprint for the given lighting node based on the linear, normalized, and polarized values. In some embodiments, identifying a new lighting node may include identifying one or more of the roles that is not currently assigned to one of the plurality of lighting nodes.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radio luminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The terms "lighting fixture" and "luminaire" are used herein to refer to an implementation or arrangement of one or more lighting units in a particular form factor, assembly, or package. The terms "lighting unit" and "lamp" are used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. The term "lighting node" as used herein refers to either a lamp or a luminaire that additionally includes components to allow for the lighting node to wirelessly communicate with other devices, such as other lighting nodes in a lighting system.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present disclosure discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g., for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

The term "database" as used herein refers to any collection of structured or unstructured data stored in one or more computer readable media.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure.

DETAILED DESCRIPTION

In conventional lighting systems that are comprised of multiple wireless enabled lighting nodes, replacement of one or more of the lighting nodes with a new lighting node often requires a technician to recommission the new device. For example, each lighting node in a conventional lighting system may have a particular alias, role, and/or functionality. When a new lighting node is introduced to replace a faulty node, the new lighting node must be programmed to duplicate functionality of the faulty node, which may require additional effort beyond mere replacement of the device.

Accordingly, it would be beneficial to utilize characteristics of wireless signals received by lighting nodes, such as received signal strength indicators ("RSSI") associated with wireless signals received from other lighting nodes in a lighting system, to recommission a replacement lighting node automatically, with little human intervention or expertise required. In some embodiments, the RSSI's associated with wireless signals received at a lighting node, particularly from other lighting nodes of a lighting system, are used to create an RSSI fingerprint that may be utilized to identify any lighting node situated in that position relative to the other lighting nodes of the lighting system.

In view of the foregoing, various embodiments and implementations of the present disclosure are directed to generating what will be referred to herein as an "RSSI fingerprint" for each lighting node in a lighting system and utilizing the RSSI fingerprints to assign a role to a new lighting node that has been introduced to replace one of the previous lighting nodes.

Figure 1:
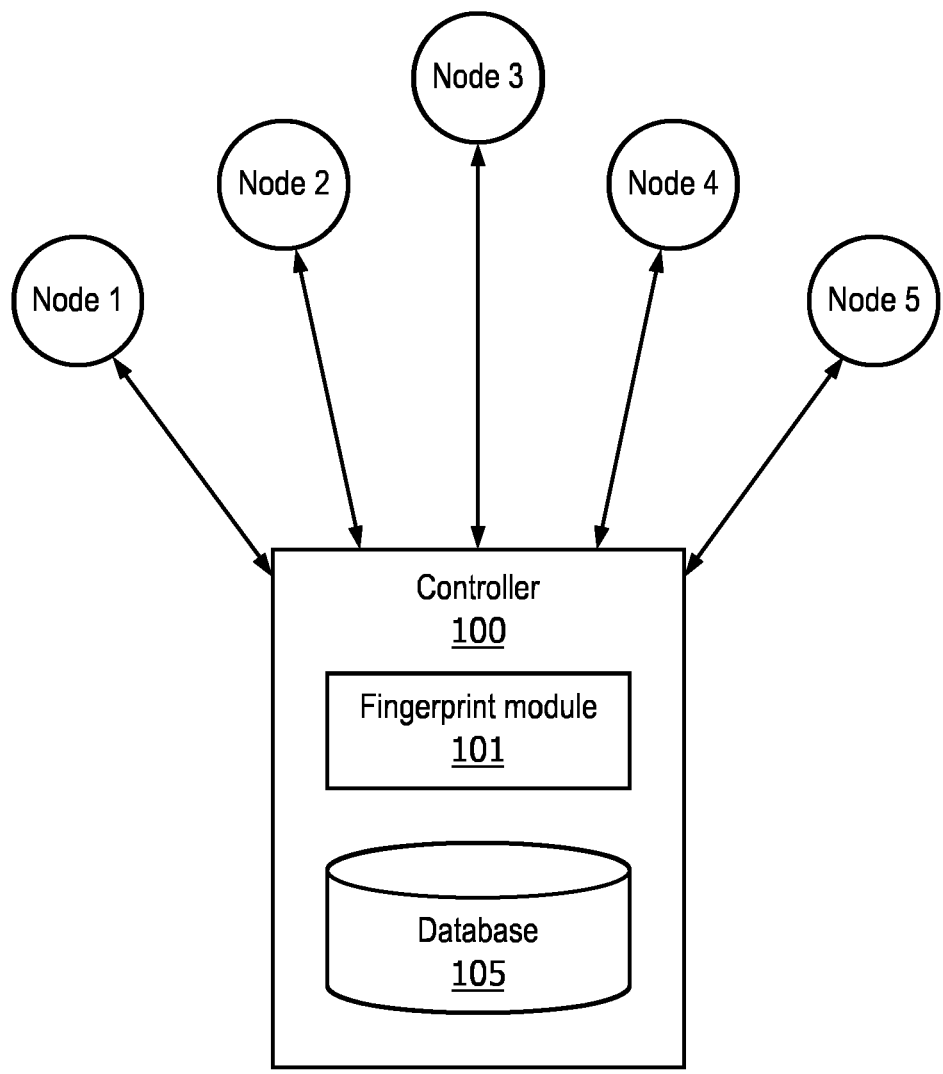
FIG. 1 illustrates an example lighting system with a plurality of lighting nodes and a controller.

Referring to FIG. 1, in one embodiment, a lighting system that includes multiple lighting nodes (NODE 1-NODE 5) and a controller 100 is depicted. Controller 100 may include logic, e.g., a microprocessor coupled with memory, a field-programmable gate array ("FPGA"), an application-specific integrated circuit ("ASIC"), etc., that is configured to perform various aspects of the present disclosure. Each lighting node may also include logic configured to perform selected aspects of the present disclosure.

Each of the lighting nodes may include one or more light sources (e.g., LED, incandescent, halogen, etc.) and a wireless network component (e.g., transmitter, receiver, transceiver, etc.) and may be, for example, a lamp or a luminaire. Thus, each of the lighting nodes is in wireless communication with the controller 100. Various wireless communication technologies may be employed by the lighting nodes and/or the controller 100 to communicate with each other, including but not limited to Wi-Fi, Bluetooth, ad hoc or mesh networks such as ZigBee, Z-Wave, Thread, Insteon, AirPort, and so forth. The controller 100 may transmit wireless signals to one or more of the lighting nodes to instruct the lighting node(s) to perform one or more tasks. For example, controller 100 may provide a signal to Node 1 to instruct Node 1 to turn its light source off, dim, change colors, and/or other functions. Thus, in some embodiments, each node may be configured to communicate with controller 100 via a unique communication channel.

Each of the lighting nodes includes a wireless signal receiver and a wireless signal transmitter that emits a wireless signal (for communication with controller 100 and/or each other). Accordingly, each of the lighting nodes may be configured to receive signals from each of the other lighting nodes in the lighting system. Based on these signals received from other lighting nodes, each lighting node may be configured to generate, or have generated (e.g., by controller 100), a unique RSSI fingerprint that is based on a combination of RSSI's associated with wireless signals received from neighboring lighting nodes.

Figure 2:
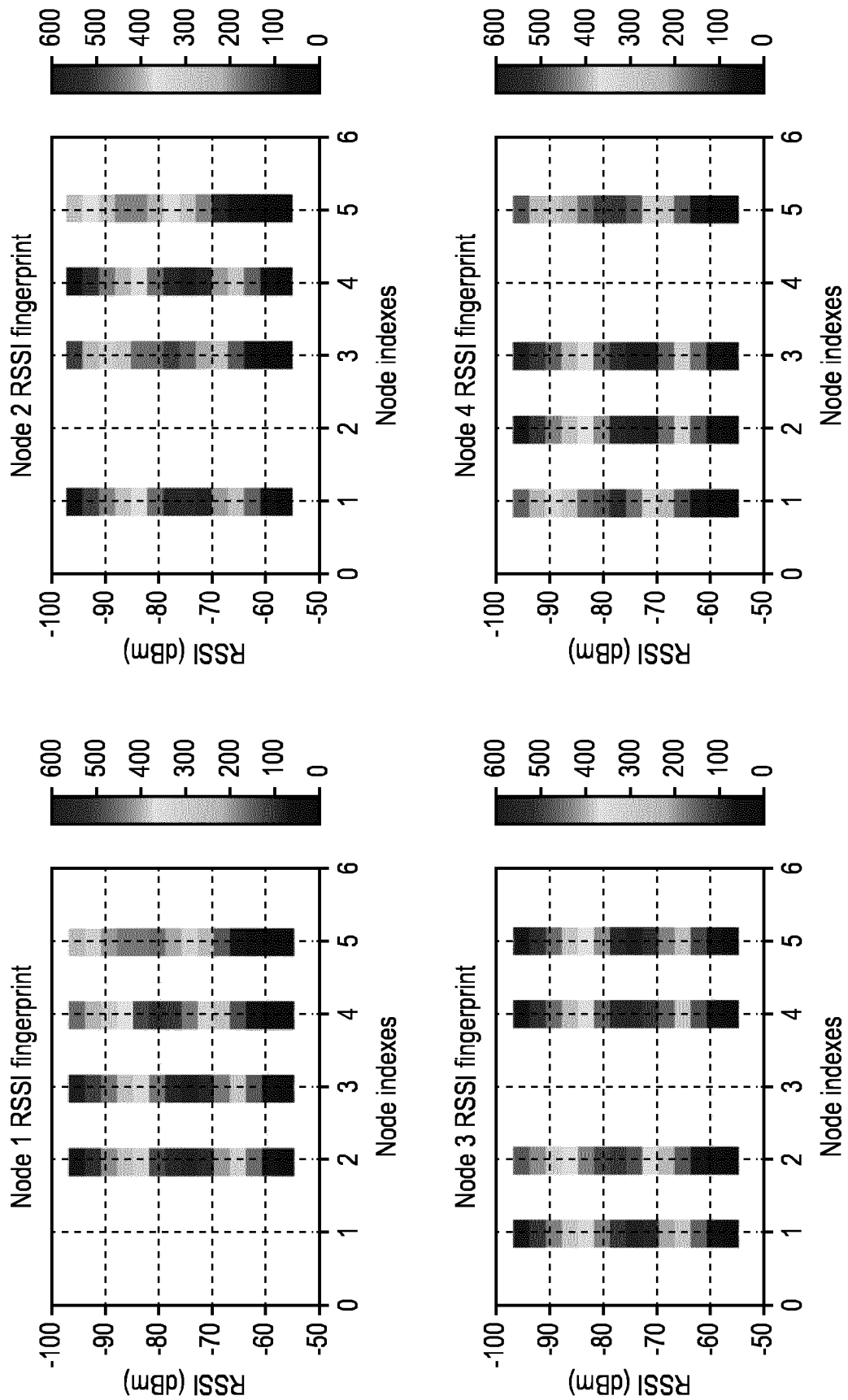
FIG. 2 illustrates example RSSI fingerprints for at least some of the nodes in FIG. 1.

Referring to FIG. 2, the RSSI fingerprints of four of the five nodes from FIG. 1 are provided (the RSSI of NODE 5 is not depicted but would have a similar appearance). Each RSSI fingerprint associated with each lighting node includes an RSSI histogram of a wireless signal received from each of the other four nodes in the lighting system such that the combination of all of the other signals for any of the nodes (i.e., the RSSI fingerprint) is unique for that lighting node. For example, for Nodes 2 and 3, although the RSSI from Node 1 appears virtually identical for each, the combination of all of the RSSI's for each of those nodes is not, resulting in unique fingerprints for Node 2 and Node 3 (e.g., different RSSI's for Node 4).

Referring back to FIG. 1, in some embodiments, fingerprint module 101 receives the fingerprints (or data that is usable to generate the fingerprints) from each of the lighting nodes. For example, each of the lighting nodes may provide controller 100 (and hence, fingerprint module 101) a wireless signal indicative of the RSSI's of wireless signals received from its neighboring lighting nodes. Fingerprint module 101 may store the fingerprints with one or more identifiers for each of the lighting nodes. In some embodiments, fingerprint module 101 may store the fingerprints in database 105. Further, one or more roles for each of the lighting nodes may be stored in database 105 and/or otherwise associated with each of the lighting nodes and/or fingerprints. For example, each of the lighting nodes may have an alias (e.g., "Node 1," "Node 2") for identification by one or more other components, and the alias may be stored with the fingerprint of each lighting node.

Figure 3:
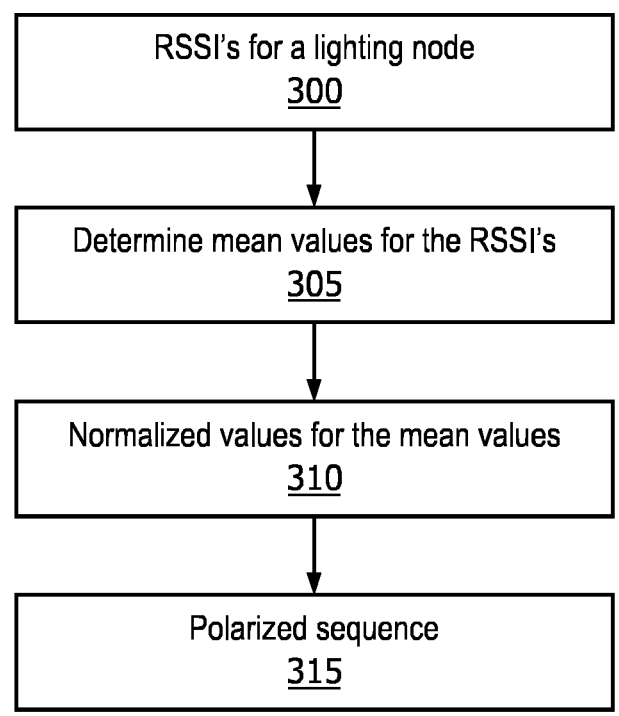
FIG. 3 illustrates a flowchart of a method for linearly converting, normalizing, and polarizing RSSI fingerprints into an RSSI fingerprint sequence.

When one of the lighting nodes is replaced with a new lighting node, the new lighting node is expected to have the same RSSI fingerprint as the out-of-commission node. As previously described, it is desirable to automatically recommission a new lighting node by assigning any role assigned to the former lighting node to the replacement node. Referring to FIG. 3, a method is provided for converting the fingerprints of FIG. 2 into a linear, normalized, and polarized sequence. While operations of FIG. 3 are depicted in a particular order, this is not meant to be limiting. In various embodiments, one or more operations may be added, omitted, and/or reordered. In some embodiments, fingerprint module 101 may store the sequences generated using a method such as that depicted in FIG. 3 in place of (or in addition to) the RSSI fingerprints (e.g., histograms) in FIG. 2.

At block 300, the RSSI values for each lighting node may be received, e.g., at controller 100. At block 305, the mean value of each of the received RSSI's 300 at a lighting node may be determined. The values may be calculated, for instance, in decibel-milliwatts (dBm) and then converted to a linear value (or sequence) in milliwatts (mW). In each of the RSSI fingerprints of FIG. 2, the shading represents a count of units (e.g., packets, samples) that were received at a particular node from each of the other nodes at a particular dBm. A mean dBm may be calculated for each node based the number of samples and corresponding dBms. In some embodiments, the four mean values calculated for a given node may then be converted into a linear value (or sequence) in mW.

In some embodiments, an equation such as the following may be used for linearization:

$$RSSI = 10^{(rawRSSI - maxRSSI)/10}$$

rawRSSI may equal a mean value of RSSI's of signals received from a particular lighting node. maxRSSI may equal a max value of RSSI's of signals received from a particular lighting node. Thus, RSSI may be, for instance, a vector linearized RSSI values. For each of the diagrams of FIG. 2, there may be, for instance, a 1×4 vector of linearized RSSI values.

Figure 4:
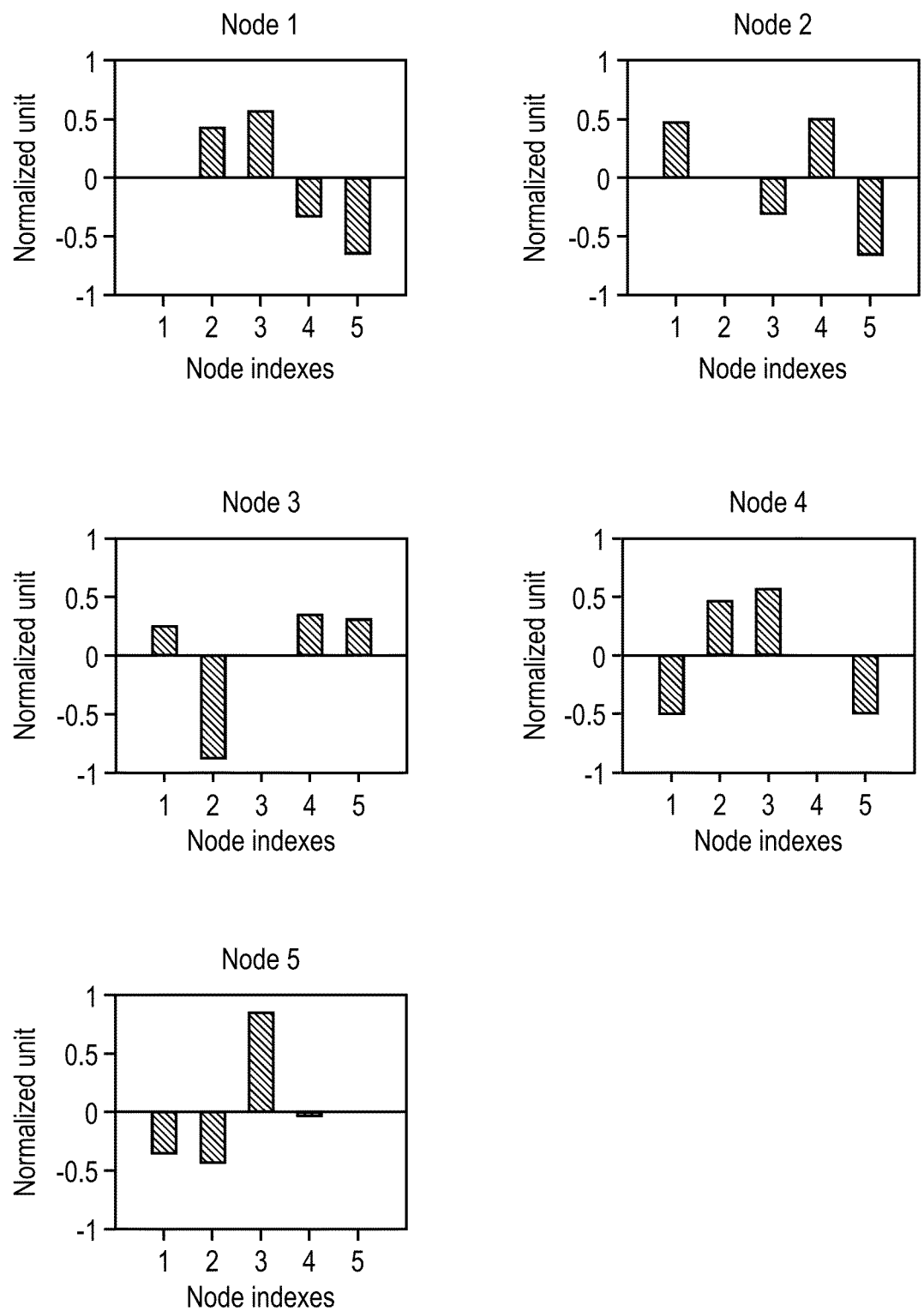
FIG. 4 the RSSI fingerprints of FIG. 2 that have been normalized and polarized according to the method of FIG. 3.

At block 310, the linear values (or sequences) calculated at block 305 may be normalized such that the sum of the sequences for each lighting node is the same (e.g., one). For example, for Node 1, the mean values may be −75 dBm from Node 2, −75 dBm from Node 3, −80 dBm from Node 4, and −85 dBm for Node 5. These values are converted to milliwatts (linear value) and the values are normalized such that the total of the values is 1. At block 315, the sequence for each lighting node may be polarized. The mean for each sequence is calculated and then each of the normalized values is subtracted from the mean. For example, referring to FIG. 4, the linear, normalized, and polarized fingerprint sequence from each of the nodes in FIG. 1 is provided, with the values for each of the fingerprints summing to zero. These normalized and polarized sequences may be stored, for instance, in database 105 and/or in memory of one or more of the lighting nodes.

In some embodiments, normalization and polarization may be performed using equations such as the following:

$$std = \sqrt{\frac{\left(RSSI - \frac{\sum RSSI}{N}\right)^2}{N}}$$

$$value = \frac{(RSSI - meanRSSI)}{std}$$

In these two equations, RSSI may be a vector of the linearized values mentioned previously. std may be a standard deviation of the RSSI vector, and N may be a positive integer corresponding to the number of elements in the RSSI vectors, which in this example is four.

Once the RSSI fingerprint sequences are determined and stored, a new lighting node that has been used to replace an out-of-service lighting node may be identified. In some embodiments, the new lighting node may be identified based on determining that a lighting node has been detected that has not been assigned a role and/or otherwise was not previously a component of the lighting system. For example, referring again to FIG. 1, Node 1 may become inoperable and a new lighting node may be installed by a technician to replace Node 1. Fingerprint module 101 may receive an RSSI fingerprint from the new Node 1 lighting node and perform the same method described in FIG. 3 to the new fingerprint.

Once the new RSSI fingerprint sequence has been determined, it is compared to all previously stored RSSI fingerprint sequences. For example, referring again to FIG. 4, if Node 3 has been replaced by a new lighting node, the RSSI fingerprint of the new lighting node should be similar to the RSSI fingerprint sequence for Node 3. The new sequence is correlated and matched with each of the sequences. The new lighting node will then be assigned the role of the node with the highest correlation score.

Additionally or alternatively, in some embodiments, a machine learning model may be utilized to determine a role to assign to a new lighting node. For example, training data may be generated based on the stored RSSI fingerprints with the associated role as the desired output (i.e. the label associated with the training example). A machine learning model such as a neural network, support vector machine, etc., may then be trained with the training data. In particular, a training example that includes data indicative an RSSI fingerprint as inputs, and which is labeled with the appropriate role or lighting node identity, may be applied as input across the machine learning model to generate output. The output may be compared with the label to determine an error. That error may be employed with various training techniques, such as stochastic gradient descent and/or back propagation, to update weights associated with the machine learning model (e.g., weights associated with one or more hidden layers of a neural network). Once the machine learning model is trained, an RSSI fingerprint for a new (replacement) lighting node may be applied as input for the machine learning model. The new lighting node may then be assigned the role that is provided as output based on the trained machine learning model.

In some embodiments, the described method may only be utilized when multiple out-of-service lighting nodes are identified. In some instances where only a single lighting node is replaced, the role assigned to the new lighting node may be determined based on identifying which role is not assigned to a lighting node and assigning that role to the new lighting node. However, the above method may be still be employed when only a single lighting node is replaced.

Figure 5:
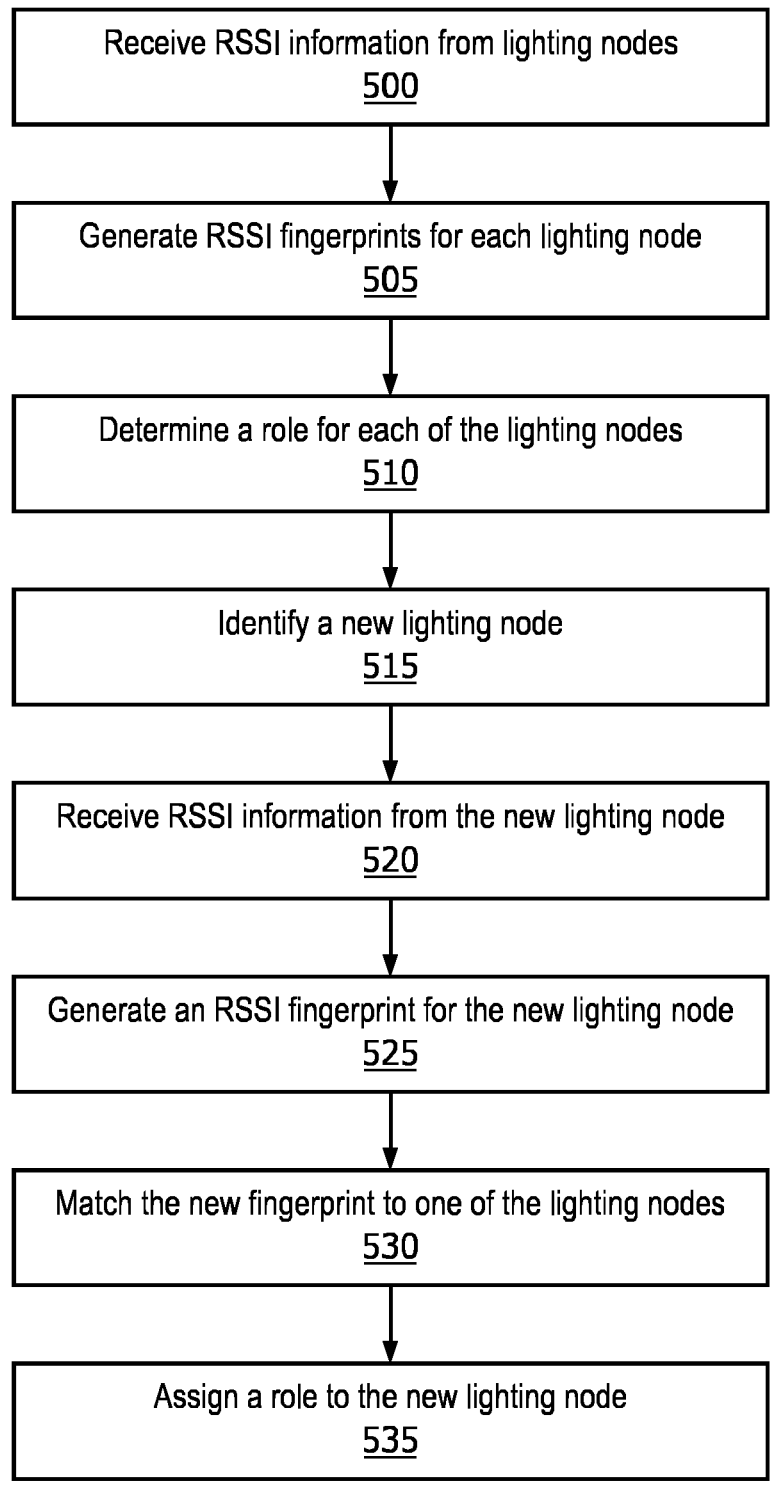
FIG. 5 illustrates a flowchart of a method for assigning a role to a new lighting node in a lighting system utilizing RSSI fingerprints.

Referring to FIG. 5, a flowchart is provided illustrating a method as described herein. Other embodiments may include additional steps and/or one or more of the steps illustrated in FIG. 5 may be omitted, reordered, etc. In some embodiments, one or more operations of FIG. 5 may be performed by controller 100. Additionally or alternatively, one or more operations of FIG. 5 may be performed at individual lighting nodes.

At block 500, RSSI information may be received from a plurality of lighting nodes in a lighting system. Each of the lighting nodes receives a wireless signal from each of the other lighting nodes in the lighting system. For example, in a lighting system with five lighting nodes, each lighting node receives four wireless signals, one from each of the other lighting nodes. Each of these four received wireless signals has an associated RSSI, and in some embodiments it is these RSSI's that are provided to controller 100.

At step 505, the RSSI information received from each lighting node at block 500 are utilized to generate, e.g., by controller 100, an RSSI fingerprint for each of the lighting nodes. An RSSI fingerprint for a given lighting node includes signal strength information associated with wireless signal(s) received at that lighting node from other lighting nodes. For example, for a lighting node in a lighting system of five nodes, the RSSI fingerprint may include the RSSI of a respective wireless signal received by that lighting node from each of the other lighting nodes. The RSSI fingerprints illustrated in FIG. 2 are examples of RSSI fingerprints from a 5-node lighting system. Further, in some embodiments, the RSSI fingerprints may be linearly converted, normalized, and polarized into an RSSI fingerprint sequence before storage, as depicted in FIG. 3.

At step 510, a role is determined for each of the lighting nodes in the lighting system. A role may include, for example, an alias for the lighting node, an assignment of a lighting node to one or more control devices, and/or illumination settings for the lighting node. Roles for lighting nodes may be configured by one or more technicians and stored in a database, such as database 105, and the role for each lighting node may be determined once the RSSI fingerprint of each lighting node has been generated. The RSSI fingerprints may then be stored in database 105, each associated with the role of a corresponding lighting node.

At step 515, a new lighting node is identified. The new lighting node may be identified based on first determining that one or more of the roles for lighting nodes of the lighting system is not currently assigned to one of the lighting nodes. Particularly, when multiple lighting nodes are being replaced at the same time (i.e., when multiple new lighting nodes are identified), multiple unassigned roles may be identified. For example, in a system with five lighting nodes, the roles for both Node 1 and Node 2 may be unassigned, and two new lighting nodes may be identified.

At step 520, RSSI information is received from the new lighting node (or from each lighting node, if multiple new lighting nodes are identified). In some embodiments, Step 520 may share one or more characteristics with step 500.

At step 525, the RSSI fingerprint of the new lighting node is matched to one of the stored RSSI fingerprints of the lighting node, as generated in step 505. Further, at step 535, the role associated with the matching RSSI fingerprint may be assigned to the new lighting node. In some embodiments, all stored RSSI fingerprints may be compared to the new RSSI fingerprint, and role associated with the best match may be assigned to the new lighting node. In some embodiments, only roles that are not currently assigned to a lighting node may be matched to the new RSSI fingerprint, with the role of the best match being assigned to the new lighting node. For example, if the roles of Node 1 and Node 2 are not currently assigned to a lighting node, only the RSSI fingerprints of Node 1 and Node 2 may be compared to the new RSSI fingerprint.

In FIG. 5, the RSSI information is provided by lighting nodes to controller 100, and it is controller 100 that computes the RSSI fingerprints. However, this is not meant to be limiting. In various embodiments, each lighting node may include logic, e.g., a microprocessor coupled with memory, a, FPGA, an ASIC, etc., that is configured to compute the RSSI fingerprints locally and then provide those fingerprints to controller 100.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

The invention claimed is:

1. A method, comprising:
    receiving, at each lighting node of a plurality of lighting nodes, a plurality of respective wireless signals from the other lighting nodes of the plurality of lighting nodes;
    determining, for each lighting node of the plurality of lighting nodes, received signal strength indicators (RSSI) for each of the plurality of respective wireless signals received from the other lighting nodes;
    generating, for each lighting node of the plurality of lighting nodes, an RSSI fingerprint based on the RSSIs of the respective wireless signals received from the other lighting nodes;
    determining a respective lighting node role for each lighting node of the plurality of lighting nodes;
    storing associations between the RSSI fingerprints and the lighting node roles;
    identifying a new lighting node that has been used to replace an out-of-service lighting node of the plurality of lighting nodes;
    receiving, at the new lighting node, a plurality of respective wireless signals from the remaining lighting nodes of the plurality of lighting nodes;
    generating a new RSSI fingerprint for the new lighting node based on the plurality of respective wireless signals from the remaining lighting nodes;
    determining, based on the RSSI fingerprints and the new RSSI fingerprint, that the new lighting node is a replacement for the out-of-service lighting node; and
    assigning the lighting node role previously assigned to the out-of-service lighting node to the new lighting node.

2. The method of claim 1, wherein at least one of the plurality of lighting nodes does not have light detection capability.

3. The method of claim 1, further comprising:
    generating training data based on the RSSI fingerprints; and
    training a machine learning model based on the training data, wherein determining that the new lighting node is a replacement for the out-of-service node includes providing the new RSSI fingerprints as input to the trained machine learning model, and wherein
the assigning is based on output from the machine learning model.

4. The method of claim 1, wherein an RSSI fingerprint for a given lighting node is indicative of respective signal strengths of the plurality of respective wireless signals from the other lighting nodes of the plurality of lighting nodes.

5. The method of claim 1, wherein a lighting node role for a given lighting node includes an alias for the given lighting node.

6. The method of claim 1, wherein generating the RSSI fingerprint for a given lighting node of the plurality of lighting nodes includes:
    determining a mean RSSI value of the RSSIs of the respective wireless signals received at the given lighting node from the other lighting nodes of the plurality of lighting nodes;
    converting the mean RSSI value into a linear value;
    normalizing the linear value with linear values determined for the other lighting nodes;
    polarizing the normalized linear value with normalized linear values for the other lighting nodes; and
    generating the RSSI fingerprint for the given lighting node based on the linear, normalized, and polarized values.

7. The method of claim 1, wherein identifying a new lighting node includes identifying one or more of the lighting node roles that is not currently assigned to one of the plurality of lighting nodes.

8. A system comprising memory coupled with one or more processors, wherein the one or more processors are configured to execute instruction in the memory to perform the following operations:
    receiving, at each lighting node of a plurality of lighting nodes, a plurality of respective wireless signals from the other lighting nodes of the plurality of lighting nodes;
    determining, for each lighting node of the plurality of lighting nodes, received signal strength indicators (RSSI) for each of the plurality of respective wireless signals received from the other lighting nodes;
    generating, for each lighting node of the plurality of lighting nodes, an RSSI fingerprint based on the RSSIs of the respective wireless signals received from the other lighting nodes;
    determining a respective lighting node role for each lighting node of the plurality of lighting nodes;
    storing associations between the RSSI fingerprints and the lighting node roles;
    identifying a new lighting node that has been used to replace an out-of-service lighting node of the plurality of lighting nodes;
    receiving, at the new lighting node, a plurality of respective wireless signals from the remaining lighting nodes of the plurality of lighting nodes;
    generating a new RSSI fingerprint for the new lighting node based on the plurality of respective wireless signals from the remaining lighting nodes;
    determining, based on the RSSI fingerprints and the new RSSI fingerprint, that the new lighting node is a replacement for the out-of-service lighting node; and
    assigning the lighting node role previously assigned to the out-of-service lighting node to the new lighting node.

9. The system of claim 8, further configured to perform the following operations:
   generating training data based on the RSSI fingerprints; and
   training a machine learning model based on the training data, wherein
   determining that the new lighting node is a replacement for the out-of-service node includes providing the new RSSI fingerprints as input to the trained machine learning model, and wherein the assigning is based on output from the machine learning model.

10. The system of claim 8, wherein an RSSI fingerprint for a given lighting node is indicative of respective signal strengths of the plurality of respective wireless signals from the other lighting nodes of the plurality of lighting nodes.

11. The system of claim 8, wherein a lighting node role for a given lighting node includes an alias for the given lighting node.

12. The system of claim 8, wherein generating the RSSI fingerprint for a given lighting node of the plurality of lighting nodes includes:
   determining a mean RSSI value of the RSSIs of the respective wireless signals received at the given lighting node from the other lighting nodes of the plurality of lighting nodes;
   converting the mean RSSI value into a linear value;
   normalizing the linear value with linear values determined for the other lighting nodes;
   polarizing the normalized linear value with normalized linear values for the other lighting nodes; and
   generating the RSSI fingerprint for the given lighting node based on the linear, normalized, and polarized values.

13. The system of claim 8, wherein identifying a new lighting node includes identifying one or more of the lighting node roles that is not currently assigned to one of the plurality of lighting nodes.

14. At least one non-transitory computer-readable medium comprising instructions that, in response to execution of the instructions by one or more processors, cause the one or more processors to perform the following operations:
   receiving, at each lighting node of a plurality of lighting nodes, a plurality of respective wireless signals from the other lighting nodes of the plurality of lighting nodes;
   determining, for each lighting node of the plurality of lighting nodes, received signal strength indicators (RSSI) for each of the plurality of respective wireless signals received from the other lighting nodes;
   generating, for each lighting node of the plurality of lighting nodes, an RSSI fingerprint based on the RSSIs of the respective wireless signals received from the other lighting nodes;
   determining a respective lighting node role for each lighting node of the plurality of lighting nodes;
   storing associations between the RSSI fingerprints and the lighting node roles;
   identifying a new lighting node that has been used to replace an out-of-service lighting node of the plurality of lighting nodes;
   receiving, at the new lighting node, a plurality of respective wireless signals from the remaining lighting nodes of the plurality of lighting nodes;
   generating a new RSSI fingerprint for the new lighting node based on the plurality of respective wireless signals from the remaining lighting nodes;
   determining, based on the RSSI fingerprints and the new RSSI fingerprint, that the new lighting node is a replacement for the out-of-service lighting node; and
   assigning the lighting node role previously assigned to the out-of-service lighting node to the new lighting node.

15. The least one non-transitory computer-readable medium of claim 14, further comprising instructions to perform the following operations:
   generating training data based on the stored RSSI fingerprints; and
   training a machine learning model based on the training data, wherein
   determining that the new lighting node is a replacement for the out-of-service node includes providing the new RSSI fingerprints as input to the trained machine learning model, and wherein the assigning is based on output from the machine learning model.

\* \* \* \* \*